United States Patent
Kim et al.

(10) Patent No.: US 8,752,031 B2
(45) Date of Patent: Jun. 10, 2014

(54) COMPILING METHOD AND PROCESSOR USING THE SAME

(75) Inventors: Taisong Kim, Seoul (KR); Hong-Seok Kim, Seongnam-si (KR); Chang-Woo Baek, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1216 days.

(21) Appl. No.: 12/325,361

(22) Filed: Dec. 1, 2008

(65) Prior Publication Data

US 2009/0217249 A1 Aug. 27, 2009

(30) Foreign Application Priority Data

Feb. 27, 2008 (KR) ......................... 10-2008-0017957

(51) Int. Cl.
*G06F 9/44* (2006.01)

(52) U.S. Cl.
USPC ............................ 717/135; 717/136; 717/140

(58) Field of Classification Search
None
See application file for complete search history.

(56) References Cited

U.S. PATENT DOCUMENTS

| | | | | |
|---|---|---|---|---|
| 5,857,093 A * | 1/1999 | Bradford | ......................... | 703/21 |
| 6,173,440 B1 | 1/2001 | Darty | | |
| 6,223,337 B1 | 4/2001 | Blume | | |
| 6,601,024 B1 * | 7/2003 | Chonnad et al. | ................. | 703/14 |
| 6,691,286 B1 * | 2/2004 | McElvain et al. | ............. | 716/103 |
| 7,305,666 B2 * | 12/2007 | Burger et al. | ................. | 717/140 |
| 7,415,700 B2 * | 8/2008 | Pomaranski et al. | ......... | 717/127 |
| 7,606,695 B1 * | 10/2009 | Nouri et al. | ...................... | 703/22 |
| 7,904,850 B2 * | 3/2011 | Spackman et al. | ............ | 717/136 |
| 2004/0154002 A1 * | 8/2004 | Ball et al. | ....................... | 717/135 |
| 2005/0071791 A1 * | 3/2005 | Buckley | ............................. | 716/4 |
| 2005/0071823 A1 * | 3/2005 | Lin et al. | ........................ | 717/136 |
| 2005/0081191 A1 * | 4/2005 | Pomaranski et al. | ......... | 717/124 |
| 2005/0097523 A1 * | 5/2005 | Uchida | .......................... | 717/136 |
| 2005/0138485 A1 | 6/2005 | Osecky et al. | | |
| 2005/0246693 A1 * | 11/2005 | Plum | ............................. | 717/140 |
| 2006/0101433 A1 | 5/2006 | Opem et al. | | |
| 2007/0113219 A1 * | 5/2007 | Terry | ............................. | 717/135 |
| 2008/0141227 A1 * | 6/2008 | Waters et al. | ................. | 717/140 |
| 2008/0301651 A1 * | 12/2008 | Seneski et al. | ................ | 717/135 |

FOREIGN PATENT DOCUMENTS

JP 2004-38617 A 2/2004

OTHER PUBLICATIONS

Leinenbach et al.Towards the Formal Verification of a C0 Compiler: Code Generation and Implementation Correctness.Third IEEE International Conference on Software Engineering and Formal Methods, Sep. 2005, pp. 2-11, Retrieved on [Jan. 16, 2014] Retrieved from the Internet: URL<http://ieeexplore.ieee.org/xpls/abs_all.jsp?arnumber=1575889&tag=1>.*

(Continued)

*Primary Examiner* — Thuy Dao
*Assistant Examiner* — Cheneca Smith
(74) *Attorney, Agent, or Firm* — NSIP Law

(57) ABSTRACT

A compiling method and a processor using the same are provided. The compiling method includes simulating a first program code which includes at least one first operation command to generate a first operation result, compiling the first program code to generate a second program code which includes at least one second operation command, simulating the second program code to generate a second operation result, and comparing the first operation result with the second operation result to verify whether the second program code is valid.

11 Claims, 11 Drawing Sheets

(56) References Cited

OTHER PUBLICATIONS

Leroy, Xavier. Formal Certification of a Compiler Back-end or: Programming a Compiler with a Proof Assistant. POPL '06 Conference record of the 33rd ACM SIGPLAN-SIGACT symposium on Principles of programming languages, Jan. 2006, pp. 42-54, Retrieved on [Jan. 16, 2014] Retrieved from the Internet: URL<http://dl.acm.org/citation.cfm?id=1111042>.*

Krumme, David E., et al., "A Practical Method for Code Generation Based on Exhaustive Search," ACM Sigplan Notices, ACM, Association for Computing Machinery, New York, NY, vol. 17, No. 6, Jun. 1982, pp. 185-196.

Massalin, Henry, "Superoptimizer—A Look at the Smallest Program," Proceedings of the International Conference on Architectural Support for Programming Languages and Operating Systems (ASPLOS), Palo Alto, Oct. 5-8, 1987, pp. 122-126.

Korean Office Action mailed Jan. 27, 2014 in counterpart Korean Application No. 10-2008-0017957 (6 pages, in Korean).

\* cited by examiner

610 op2   r2 ← 0
620 op3   r4 ← 2
630 op4   r1 ← r2+1
640 op11  mem[sp+4] ← r1
650 op5   r3 ← r4+3
660 op6   r5 ← 4
670 op7   r5 ← r3+r5
680 op12  r1 ← mem[sp+4]
690 op8   r5 ← r1+r5

940   op11   mem[sp+4] ← p1

950   op5    p1 ← p2+3

960   op6    p2 ← 4

970   op7    p2 ← p1+p2

980   op12   p1 ← mem[sp+4]

990   op8    p2 ← p1+p2

COMPILING METHOD AND PROCESSOR USING THE SAME

CROSS-REFERENCE TO RELATED APPLICATION

This application claims the benefit under 35 U.S.C. §119(a) of a Korean Patent Application No. 10-2008-0017957, filed on Feb. 27, 2008, in the Korean Intellectual Property Office, the entire disclosure of which is incorporated herein by reference.

TECHNICAL FIELD

The following description relates to compliers, and more particularly, a method for compiling program codes and a processor using the same.

BACKGROUND

Generally, a compiler transforms a program code described in programming languages, such as, Formula Translator (Fortran), C, C++ (CPP), and the like, to an appropriate command to be executed in a processor. The operations of a compiler may be divided into a front-end, a machine-independent transformation, a machine-dependent transformation, and the like.

The front-end operation transforms a program code described with programming languages to an intermediate representation (IR), which may be easily processed in the compiler. The machine-dependent transformation is also referred to as a back-end operation, and may be easily affected by a configuration of a processor where the program code is executed.

Since a new algorithm may be used or algorithms updated every time a processor is developed or upgraded, a new compiler may be required to be developed or upgraded for the back-end operation.

Where a compiler is newly developed or upgraded, a compiler developer may need to verify the accuracy of the compiler. The verifying operation of the compiler is referred to as 'debugging the compiler'. Since a code that is transformed during the back-end operation is a machine-friendly code, it may be difficult for a person having an ordinary skill in the art to verify the accuracy of a compiler by observing the compiling operations.

Also, a certification scheme based on a formal theory may be used for debugging a compiler. However, while the certification scheme may accurately verify the compiler in theory, which is based on a mathematic model, the certification scheme is difficult to implement due to its complexity.

SUMMARY

In one general aspect, there is provided a new compiling method that verifies a validity of a compiler.

In another general aspect, there is provided a compiling method that verifies a validity of a compiler used in a reconfigurable processor.

In still another general aspect, a compiling method includes simulating a first program code which includes at least one first operation command to generate a first operation result, compiling the first program code to generate a second program code which includes at least one second operation command, simulating the second program code to generate a second operation result, and comparing the first operation result with the second operation result to verify whether the second program code is valid.

The compiling of the first program code may comprise assigning an operation identifier to each of the at least one first operation command, and the comparing of the first program result with the second operation result may comprise comparing an operation result of each of the at least one first operation command with an operation result of one of the at least one second operation command which corresponds to the operation identifier assigned to the each of the at least one first operation command.

The comparing of the first program result with the second operation result may not verify an operation result of the second operation command having no corresponding operation identifier from among an operation identifier assigned to each of the at least one first operation command.

The comparing of the first program result with the second operation result may not verify an operation result of the first operation command having no second operation command which corresponds to an operation identifier assigned to each of the at least one first operation command.

The compiling of the first program code may comprise scheduling the first program code based on parallelism of a processor where the first program code is executed.

The compiling of the first program code may comprise register-allocating the first program code so that a number of registers which are simultaneously activated while the first program code is executed does not surpass a number of registers supported by hardware.

The simulating of the first program code may comprise simulating the first program code by referring to stack information of the second program code, which is generated after the first program code is register-allocated.

In yet another general aspect, a processor includes a code transformer to compile a first program code which includes at least one first operation command to generate a second program code which includes at least one second operation command, a first simulator to simulate the first program code to generate a first operation result, and a second simulator to simulate the second program code to generate a second operation result, wherein the processor verifies whether the second program code is valid by comparing the first operation result and the second operation result.

The code transformer may assign an operation identifier to each of the at least one first operation command.

The processor may be a reconfigurable processor having a plurality of functional units and using the plurality of functional units in parallel according to operation commands to be executed.

The processor may compare an operation result of each of the first operation command with an operation result of one of the at least one second operation command which corresponds to the operation identifier assigned to the each of the at least one first operation command.

The code transformer may register-allocate the first program code so that a number of registers which are simultaneously activated while the first program code is executed does not surpass a number of registers supported by hardware.

The code transformer may transmit stack information of the second program code, which is generated after the first program code is register-allocated, and the first simulator may simulate the first program code by referring to the stack information.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 is a diagram illustrating a program code prior to compiling, according to an exemplary embodiment.

FIG. 6 is a diagram illustrating a compiled program code of FIG. 3 according to an exemplary embodiment.

FIG. 9 is a diagram illustrating a program code after the program code of FIG. 6 is register-allocated, according to an exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

Figure 1:
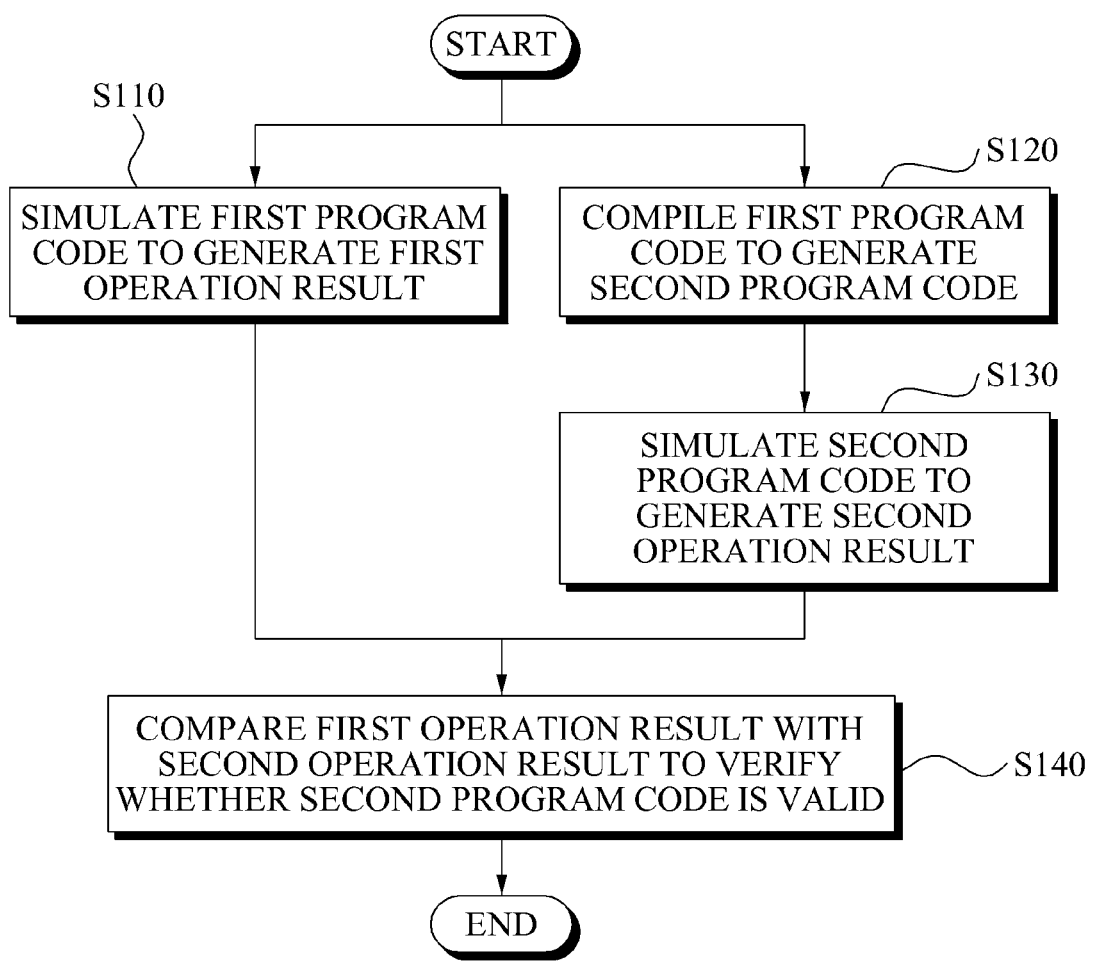
FIG. 1 is a flowchart illustrating a compiling method according to an exemplary embodiment.

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

A device executing a predetermined operation may be embodied by hardware or software. Where a network controller for controlling a network interface is embedded in a computer chip, the network controller may only execute a predetermined network interface function, which is defined when the network controller is fabricated in a factory. In the case of a device using hardware, it may be impossible to alter the network controller function after the network controller is fabricated. In the case of a device using software, a desired program may be programmed by a user and executed in a general purpose processor to meet a requirement of the user. In the case of the device using software, it may be possible to add a new function by altering software after the original hardware is fabricated in the factory. Although various functions may be performed by the device using software, in a given hardware, performance may be deteriorated when compared with the device using hardware.

Accordingly, reconfigurable processor architecture is provided. The reconfigurable processor architecture may be customized to solve certain problems after a device is fabricated. The processor architecture may also adopt a spatially-customized customized calculation to execute the calculation.

The architecture of the reconfigurable processor may be embodied using a processor core and a coarse grained array (CGA) being capable of processing a plurality of commands in parallel.

A machine language consists of "1s" and "0s" and is executed in a processor. Since it may not suitable for a user to handle the machine language, the user may program a program code using a high-level programming language which is easy for the user to handle, or assembly language generated by corresponding combination of "1s" and "0s" to predefined words.

A compiler transforms programming commands such as C language, Formula Translator (Fortran), PASCAL, and C++ (CPP), which are easy for a user to handle, to suitable commands to be executed in a processor. Among the transforming operations of the compiler, a dependent back-end operation is complex since the back-end operation is performed based on hardware information.

Since the hardware information may be changed in a reconfigurable processor, and relations between a plurality of functional units configuring the reconfigurable processor may be defined, the back-end compiling operation of the reconfigurable processor is complex.

An operation that verifies whether a program code is transformed without an error, detects an error where the error exists, and corrects the detected error, may be referred to as 'debugging'. A dynamic debugging method of a compiler that may be suitably adopted in a reconfigurable processor is provided herein. Also, depending on embodiments, a suitable compiling method where the dynamic debugging method is applied is provided herein.

A compiling method or debugging method of a compiler according to an exemplary embodiment may verify the accuracy of a compiler based on whether a program code prior to compiling provides an identical result compared with a program code after the compiling via an identical simulation.

Certain embodiments disclosed herein may provide a compiling method or debugging method of a compiler capable of checking simulation results of a program code prior and a program code after the compiling point by point.

FIG. 1 illustrates an exemplary compiling method.

Referring to FIG. 1, the compiling method simulates a first program code to generate a first operation result in operation S110.

The first program code may include at least one first operation command. The first operation result may be generated with respect to each of the at least one first operation command.

The compiling method compiles the first program code to generate a second program code in operation S120.

The second program code may include at least one second operation command. The number of the at least one second operation command may be identical to the number of the at least one first operation command, or not. In the operation S120, the first program code may be compiled via, for example, code selection, register allocation, dead code elimination, and scheduling schemes.

The compiling method simulates the second program code to generate the second operation result in operation S130. The second operation result may be generated with respect to each of the second operation command.

The compiling method compares the first operation result with the second operation result to verify whether the second program code is valid in operation S140.

Figure 2:
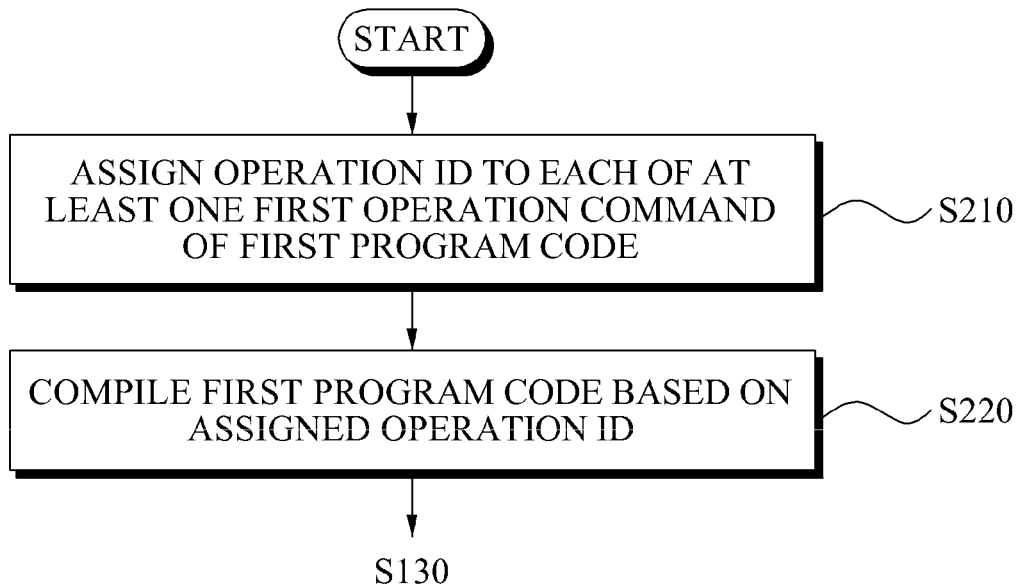
FIG. 2 is a flowchart illustrating an exemplary operation of S120 in FIG. 1.

FIG. 2 illustrates an exemplary operation of S120 in FIG. 1.

Referring to FIG. 2, the compiling method may assign an operation identifier (ID) to each of the at least one first operation command of the first program code in operation S210.

The compiling method compiles the first program code based on the assigned operation ID in operation S220.

In this case, in the operation S140 of FIG. 1, the first operation result of the at least one first operation command may be compared with the second operation result of the at least one second operation command corresponding to an identical operation ID of the first operation command.

For example, from among the first program code, the first operation result of the at least one first operation command being assigned an operation ID "1" is compared with the second operation result of the at least one second operation command having an operation ID "1".

From among operation commands, an operation command whose result value is not used by a subsequent operation command nor provide a final result may be referred to as a 'dead code'. The compiling method may identify a dead code based on a relation between operation commands and eliminate the identified dead code. Such compiling scheme may be referred to as a 'dead code elimination' scheme.

The compiling method identifies a dead code from among the at least one first operation command using a dead code elimination scheme, and may not compile the identified dead code. Therefore, a second operation command having an identical ID to the dead code may not exist in the generated second program code. In this case, since there is no target object to compare with the first operation result of the dead code in the operation S140, the first operation result of the dead code may not be verified. Where there is an error in the compiling operation during the course of the operation S120, a first operation command, not the dead code, may be eliminated. In this case, the error in the compiling operation maybe detected without verifying the first operation result of the dead code in the operation 140 since the error may be found in the second operation result of the at least one second operation command.

A processor executing a program code may process an operation command using a single pipeline structure or a plurality of pipeline structures. The processor processing an operation command using the plurality of pipeline structure may reduce a time to execute a program code since the processor may process a plurality of operation commands in parallel.

In a parallel processor processing a plurality of operation commands in parallel, all operation commands may not be executed in parallel. A single operation command may perform an operation using an output value of another operation command. The operation command using the output value of another operation command as an input value has data dependency on the other operation command. Since there is data dependency between the operation commands, the time to execute the program code using the parallel processor may not be fully minimized.

To minimize the time to execute the program code in the parallel processor, the compiler may select an operation command having no dependency between operation commands by adjusting orders of the operation commands and arrange the selected operation command to be simultaneously executed. Such an operation may be referred to as a 'scheduling operation'.

A number of an operation command simultaneously executed by the parallel processor may be determined based on a configuration of hardware of the parallel processor. Where the parallel processor includes a plurality of functional units functioning in parallel, the parallel processor may simultaneously process operation commands as many as a number of the plurality of functional units.

A scheduling operation of the compiler may be performed by considering a number of an operation command that may be processed in the parallel processor. Even where a number of an operation command having no dependency between operation commands is large, a number of an operation command that may be simultaneously executed in the parallel processor may be limited.

An operation result of an operation command may be stored in a register. The register may be a relatively fast memory, and may temporarily store the operation result until the operation result of the operation command is used by a subsequent operation command.

A number of registers may be limited based on a configuration of hardware. Where a processor is embodied in a semiconductor, the processor may include a limited number of registers since a register may occupy a relatively large area in the semiconductor.

A user generally programs a program code under the condition that there is no limit to a number of registers. The compiler may transform a program code so that the program code may be executed according to a number of given registers.

If a number of registers simultaneously required in a program code prior to compiling is greater than the number of given registers, the compiler may select a portion of excess registers, and add an operation command storing contents of the selected register in a memory. Since the stored contents of the selected register in the memory may s not be maintained in the register, the compiler may reduce a number of registers which are simultaneously used in a program code by adding an operation command as described above. This operation may be referred to as 'register-allocation'. The register-allocation operation may add an operation command which loads the stored contents to the register. Where other operation commands do not use a register, the stored contents in the memory may be loaded to the register by the added operation command and may be used by a subsequent command.

The added operation command which is added by the register-allocation operation may be referred to as a 'spill code'. Information about the register of which contents a single spill code stores in a particular address of a memory may be stored additionally. The stored contents in the memory may be loaded to a register by the additionally stored information while the program code is executed. The additionally stored information may be stored according to orders of the Last In First Out (LIFO) or the First In Last Out (FILO). For the convenience of description, a data structure which is stored according to those orders may be referred to as a 'stack structure', and the additionally stored data may be referred to as 'stack information'.

The compiler may increase a number of operation commands in a program code while performing the register-allocation or scheduling operation. In this case, a number of the second operation command of the second program code generated by the compiling operation may be greater than a number of the first operation command of the first program code.

The second operation command which is newly generated by the compiling operation may not have an operation ID or may have a newly assigned operation ID.

The newly assigned operation ID may be an operation ID which does not exist in the first operation command. Since the first operation command corresponding to the second operation command being newly generated via the compiling operation may not exist, an operation result of the newly generated second operation command may not be verified in the operation S140.

In the operation S110, a stack space is established by referring to the stack information of the second program code, and the first program code may be simulated using the established stack space. In this case, a size of the stack space may be established by referring to an added spill code in the operation S110.

FIG. 3 illustrates an exemplary program code prior to compiling.

Referring to FIG. 3, an operation command of a first line 310 has an operation ID op1. The operation command of the first line 310 stores "0" in a register r1.

An operation command of a second line 320 has an operation ID op2. The operation command of the second line 320 stores "0" in a register r2.

An operation command of a third line 330 has an operation ID op3. The operation command of the third line 330 stores "2" in a register r4.

An operation command of a fourth line 340 has an operation ID op4. The operation command of the fourth line 340 stores a sum of the register r2 and "1" in a register r1.

An operation command of a fifth line 350 has an operation ID op5. The operation command of the fifth line 350 stores a sum of the register r4 and "3" in a register r3.

An operation command of a sixth line 360 has an operation ID op6. The operation command of the sixth line 360 stores "4" in a register r5.

An operation command of a seventh line 370 has an operation ID op7. The operation command of the seventh line 370 stores a sum of the register r3 and the register r5 in the register r5.

An operation command of an eighth line 380 has an operation ID op8. The operation command of the eighth line 380 stores a sum of the register r1 and the register r5 in the register r5.

Figure 4:
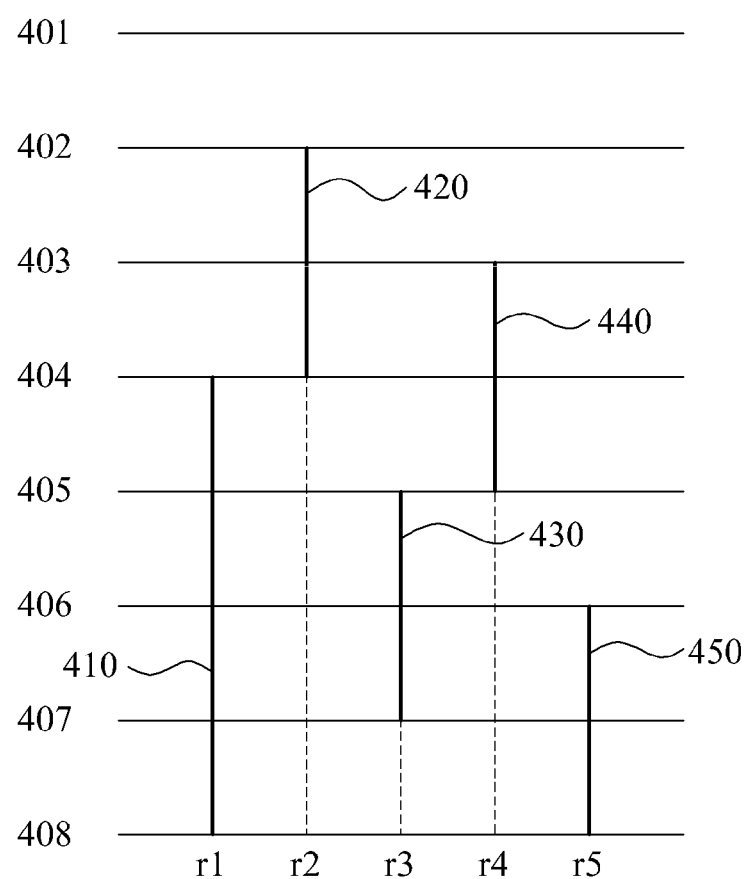
FIG. 4 is a diagram illustrating liveness of registers used in the program code of FIG. 3, according to an exemplary embodiment.

FIG. 4 illustrates liveness of registers used in the program code of FIG. 3, according to an exemplary embodiment.

Referring to FIG. 4, a frame 401 indicates the first line 310, a frame 402 indicates the second line 320, and a frame 403 indicates the third line 330. A frame 404 indicates the fourth line 340, a frame 405 indicates the fifth line 405, and a frame 406 indicates the sixth line 360. A frame 407 indicates the seventh line 370, and a frame 408 indicates the eighth line 380.

The register r1 stores "0" in the first line 310. However, the stored value is not used by other operation commands.

The register r1 stores a value in the fourth line 340, and the stored value is used by an operation command of the eighth line 380. Accordingly, the register r1 is active through periods from the fourth line 340 to the eighth line 380, and liveness 410 of the register r1 is displayed from a frame 404 to a frame 408.

The register r2 stores a value in the second line 320, and the stored value is used by an operation command of the fourth line 340. Accordingly, the register r2 is active through periods from the second line 320 to the fourth line 340, and liveness 420 of the register r2 is displayed from a frame 402 to a frame 404.

The register r3 stores a value in the fifth line 350, and the stored value is used by an operation command of the seventh line 370. Accordingly, the register r3 is active through periods from the fifth line 350 to the seventh line 370, and liveness 430 of the register r3 is displayed from a frame 405 to a frame 407.

The register r4 stores a value in the third line 330, and the stored value is used by an operation command of the fifth line 350. Accordingly, the register r4 is active through periods from the third line 330 to the fifth line 350, and liveness 440 of the register r4 is displayed from a frame 403 to a frame 405.

The register r5 stores a value in the sixth line 360, and the stored value is used by an operation command of the eight line 380. Accordingly, the register r5 is active through periods from the sixth line 360 to the eighth line 380, and liveness 450 of the register r5 is displayed from a frame 406 to a frame 408.

By referring to the graph of liveness of FIG. 4, a number of registers being simultaneously active may be understood. As an example, the registers r1, r2, and r4 are active based on the frame 404. Since the register r2 is not used after the frame 404, the compiler may replace the register r2 with the register r1 after the frame 404.

Through periods from the frames 404 to 405, it is understood that the registers r1 and r4 are active. Therefore, the registers r1 and r4 may not be replaced with each other.

As described above, a number of a physical register included in a processor may be limited. The registers described in FIGS. 3 and 4 are logical registers of a program code prior to compiling. Where a number of physical registers is less than a number of logical registers which are simultaneously required, the compiler may add an operation command storing a portion of contents of the registers in a memory by performing register-allocation. Where a number of registers used in other operation commands is decreased, the compiler may add an operation command loading the stored portion of contents in the memory to a register. The compiler may perform the register-allocation using the graph of liveness of registers of FIG. 4.

Figure 5:
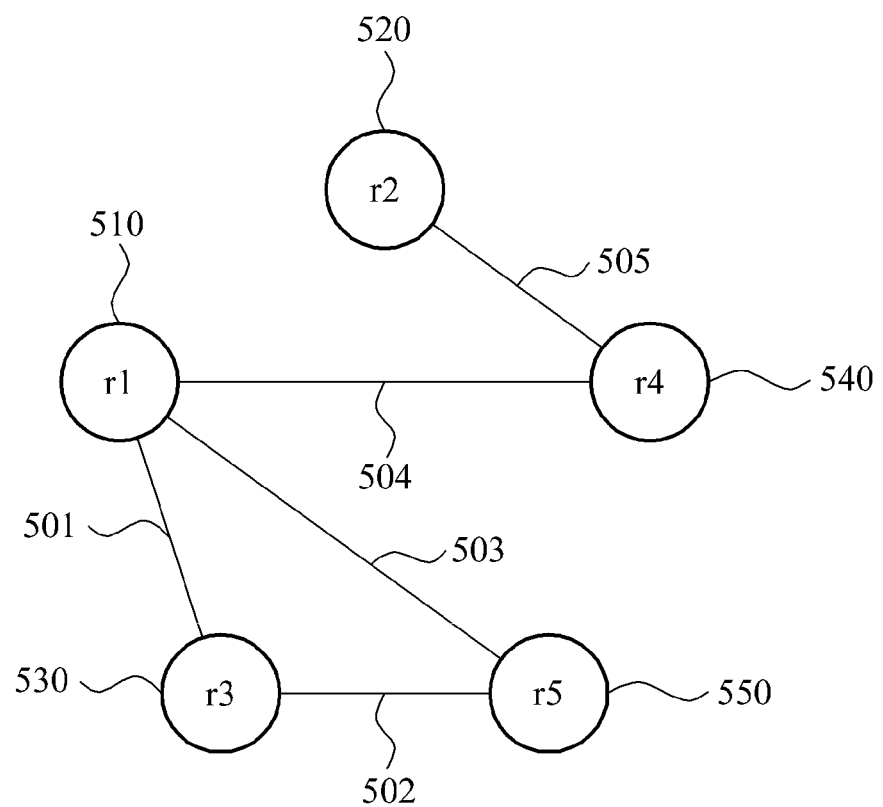
FIG. 5 is a diagram illustrating interference between the registers of FIG. 4, according to an exemplary embodiment.

FIG. 5 illustrates interference between the registers of FIG. 4, according to an exemplary embodiment.

Referring to FIG. 5, a node 510 indicates a register r1, a node 520 indicates a register r2, a node 530 indicates a register r3, a node 540 indicates a register r4, and a node 550 indicates a register r5.

Lines between the nodes indicate interference between the registers corresponding to the nodes.

In the frame 404 of FIG. 4, the register r2 terminates its function and the register r1 start its function. After the frame 404, since a value of the register r2 does not affect on the register r1, it is understood that the registers r1 and r2 do not interfere with each other. In this case, the node 510 indicating the register r1 and the node 520 indicating the register r2 are not connected with each other.

Logical registers that do not interfere with each other may be mapped on a single physical register. In the program code of FIG. 3, even where the logical registers r1 and r2 are mapped on a single physical register, for example, in p1, the operation result is not changed.

In the graph of liveness of registers of FIG. 4, since the registers r3, r4, and r5 are active while the register r1 is active, the register r1 interferes with the registers r3, r4, and r5. A line 501 shows that the registers r1 and r3 interfere with each other, a line 503 shows that the registers r1 and r5 interfere with each other, and a line 504 shows that the registers r1 and r4 interfere with each other.

Referring to the graph of liveness in FIG. 4, since the registers r1 and r5 are active while the register r3 is active, the register r3 interferes with the registers r1 and r5. The line 502 shows that the registers r3 and r5 interfere with each other.

Referring to the graph of liveness in FIG. 4, since registers r4 is active while the register r2 is active, the register r2 interferes with the register r4. A line 505 shows that the registers r2 and r4 interfere with each other.

If the compiler maps the register r2 on the physical register p1, the register r4 interfering with the register r2 may be mapped on the physical register p2. The register r1 may be mapped on a different physical register from the register p2 since the register r1 interferes with the register r4. The compiler may not map the register r1 on the physical register p1 since the register r1 does not interfere with the register r2.

The compiler may map the register r3 on the physical register p2 since the register r3 interferes with the register r1. The compiler may not map the register r5 on the physical register p1 or the physical register p2 since the register r5 interferes with the registers r1 and r3. The register r5 may be mapped on another physical register p3.

Therefore, at least three physical registers are required to perform the program code of FIG. 3. If it is possible to use only two physical registers of the processor, a spill code is required to be added to the program code of FIG. 3 in order to perform the program code of FIG. 3 in the processor.

FIG. 6 illustrates a compiled program code of FIG. 3 according to an exemplary embodiment.

Referring to FIG. 6, an operation command of a first line 610 has an operation ID op2. The operation command of the first line 610 stores "0" in a register r2.

An operation command of a second line 620 has an operation ID op3. The operation command of the second line 620 stores "2" in a register r4.

An operation command of a third line 630 has an operation ID op4. The operation command of the third line 630 stores a sum of the register r2 and "1" in a register r1.

An operation command of a fourth line 640 has an operation ID op11. The operation command of the fourth line 640 is an operation command, that is, a spill code storing a value of the register r1 in a memory [sp+4].

A compiler may not assign an operation ID to a spill code. However, since the compiler may compile again a program code with the added spill code, the compiler may assign a new operation ID to the spill code. The above 'sp' indicates a stack pointer, and 'sp+4' indicates a subsequent location of a present stack pointer. According to an aspect, an example of a single word including four bytes is illustrated, accordingly, an increment of the stack pointer is 4. Depending upon embodiments, an increase of the stack pointer may be determined based on a processor and architecture of a memory.

An operation command of a fifth line 650 has an operation ID op5. The operation command of the fifth line 650 stores a sum of a register r4 and "3" in a register r3.

An operation command of a sixth line 660 has an operation ID op6. The operation command of the sixth line 660 stores "4" in a register r5.

An operation command of a seventh line 670 has an operation ID op7. The operation command of the seventh line 670 stores a sum of the registers r3 and r5 in the register r5.

An operation command of an eighth line 680 has an operation ID op12. The operation command of the eighth line 680 is an operation command, that is, a spill code loading a value stored in the memory [sp+4] to the register r1.

An operation command of a ninth line 690 has an operation ID op8. The operation command of the ninth line 690 stores a sum of the registers r1 and r5 in the register r5.

As described above, in the operation command of the first line 310 of FIG. 3, the value stored in the register r1 is not used by a subsequent operation command. The operation command of the first line 310 is a dead code, and compiler may eliminate the dead code.

In the program code, after the compiling, illustrated in FIG. 6, it is understood that the operation ID op1 corresponding to the dead code does not exist.

Figure 7:
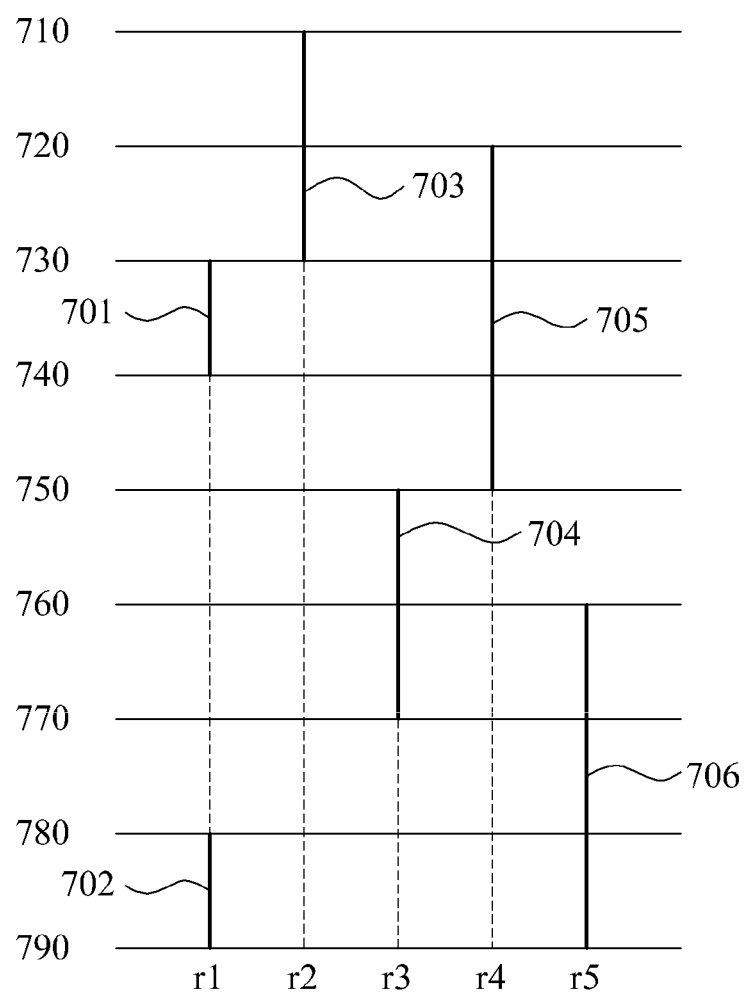
FIG. 7 is a diagram illustrating liveness of registers used in the program code of FIG. 6, according to an exemplary embodiment.

FIG. 7 illustrates liveness of registers used in the program code of FIG. 6, according to an exemplary embodiment.

Referring to FIG. 7, a frame 710 indicates the first line 610 of FIG. 6, a frame 720 indicates the second line 620, and a frame 730 indicates the third line 630. A frame 740 indicates the fourth line 640, a frame 750 indicates the fifth line 650, a frame 760 indicates the fourth line 640, a frame 770 indicates the seventh line 670, a frame 780 indicates the eighth line 680, and a frame 790 indicates the ninth line 690.

The register r1 stores a value in the third line 630, and the stored value is stored in the memory via the operation command of the fourth line 640. The register r1 is considered not to be active after the stored value in the register r1 is moved to the memory.

The register r1 is active through periods from the third line 630 to the fourth line 640, first liveness 701 of the register r1 is displayed from the frame 730 to the frame 740.

The value which is moved from the register r1 to the memory is loaded from the memory to the register r1 via the operation command of the eighth line 680. The loaded value is used by the operation command of the ninth line 690. Accordingly, the register r1 is active through periods from the eighth line 680 to the ninth line 690 of FIG. 6, and second liveness 702 of the register r1 is displayed from the frame 780 to the frame 790.

The register r2 stores a value in the first line, and the stored value is used by the operation command of the third line 630. Accordingly, the register r2 is active through periods from the first line 610 to the third line 630, and liveness 703 of the register r2 is displayed through periods from the frame 710 to the frame 730.

The register r3 stores a value in the fifth line 650, and the stored value is used by the operation command of the seventh line 670. Accordingly, the register r3 is active through periods from the fifth line 650 to the seventh line 670, and liveness 704 of the register r3 is displayed from the frame 750 to the frame 770.

The register r4 stores a value in the second line 620, and the stored value is used by the operation command of the fifth line 650. Accordingly, the register r4 is active through periods from the second line 620 to the fifth line 650, and liveness 705 of the register r4 is displayed from the frame 720 to the frame 750.

The register r5 stores a value in the sixth line 660, and the stored value is used by the operation command of the ninth line 690. Accordingly, the register r5 is active through periods from the sixth line 660 to the ninth line 690, and liveness 706 of the register r5 is displayed from the frame 760 to the frame 790.

Comparing the graph of liveness of FIG. 7 with the graph of liveness of FIG. 4, it is understood that the liveness 410 of the register r1 of FIG. 4 is divided into two livenesses 701 and 702 of FIG. 7, which are shorter than the liveness 410. Since the register r1 is not active through periods from the frame 740 to the frame 780, a physical register is not required to be mapped on the register r1 during those periods from the frame 740 to the frame 780.

In the graph of liveness of FIG. 7, it is understood that the registers r1, r2, and r3 may be mapped on a single physical register, and the registers r4 and r5 may be mapped on another physical register. By compiling the program code of FIG. 3 to the program code of FIG. 6, the compiled program code requires only two physical registers.

Figure 8:
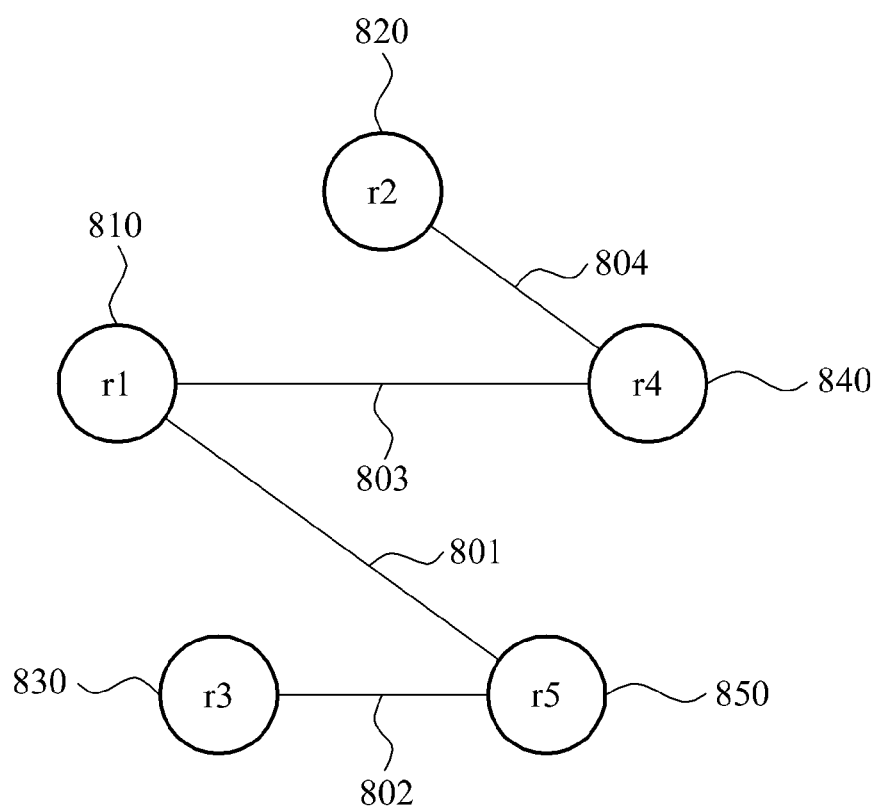
FIG. 8 is a diagram illustrating interference between the registers of FIG. 7, according to an exemplary embodiment.

The operation of mapping the logical register on the physical register may be performed using a diagram of interference of FIG. 8.

FIG. 8 illustrates interference between the registers of FIG. 7, according to an exemplary embodiment.

Referring to FIG. 8, a node 810 indicates a register r1, a node 820 indicates a register r2, and a node 830 indicates a register r3. A node 840 indicates a register r4, and a node 850 indicates register r5.

Lines between the nodes indicate interference between the registers corresponding to the nodes.

In the graph of liveness of FIG. 7, the registers r1 and r4 interfere with each other since the register r4 is live through periods from the frame 730 to the frame 740 in which the register r1 is active. A line 803 shows that registers r1 and r4 interfere with each other.

Since the register r5 is active through periods from the frame 780 to the frame 790 in which the register r1 is active, the registers r1 and r5 interfere with each other. A line 801 shows that the registers r1 and r5 interfere with each other.

Since the register r4 is active through periods from the frame 710 to the frame 730 in which the register r2 is active, the registers r2 and r4 interfere with each other. A line 804 indicates that the registers r2 and r4 interfere with each other.

Since the register r5 is active through periods from the frame 750 to the frame 770 in which the register r3 is active, the registers r3 and r5 interfere with each other. A line 802 indicates that the registers r3 and r5 interfere with each other.

Referring to FIGS. 7 and 8, the compiler may sequentially map logical registers from the frame 710.

In the frame 710, the compiler may map the logical register r2 on the physical register p1. The compiler may map the logical register r4 interfering with the logical register r2 on the physical register p2.

The compiler may map the logical register r1 interfering with the logical register r4 on the physical register p1. The compiler may map the logical register r5 interfering with the logical register r1 on the physical register p2.

The compiler may map the logical register r3 interfering with the logical register r5 on the physical register p1.

Consequently, the compiler may map the logical registers r1, r2, and r3 on the physical register p1, and may map the logical registers r4 and r5 on the physical register p2, by using the diagram of interference of FIG. 8.

As described above, the program code of FIG. 6 may be performed without an error in a processor having two physical registers. Mapping operations between logical registers and physical registers may be referred to as 'register allocation'.

FIG. 9 illustrates a program code after the program code of FIG. 6 is register-allocated according to an exemplary embodiment. Referring to FIG. 9, an operation command of a first line 910 has an operation ID op2. The operation command of the first line 910 stores "0" in a register p1.

The program code of FIG. 9 is a program code after the logical register of the program code of FIG. 6 is mapped to the physical register. Since the spill code is already assigned during the previous compiling operation, each operation command of the program code of FIG. 9 has an identical operation ID to each operation command of the program code of FIG. 6.

An operation command of a second line 920 has an operation ID op3. The operation command of the second line 920 stores "2" in a register p2.

An operation command of a third line 930 has an operation ID op4. The operation command of the third line 930 stores a sum of the register p1 and "1" in the register p1.

An operation command of a fourth line 940 has an operation ID op11. The operation command of the fourth line 940 is an operation command storing a value of the register p1 in a memory [sp+4].

An operation command of a fifth line 950 has an operation ID op5. The operation command of the fifth line 950 stores a sum of the register p2 and "3" in the register p1.

An operation command of a sixth line 960 has an operation ID op6. The operation command of the sixth line 960 stores "4" in a register p2.

An operation command of a seventh line 970 has an operation ID op7. The operation command of the seventh line 970 stores a sum of the registers p1 and p2 in the register p2.

An operation command of an eighth line 980 has an operation ID op12. The operation command of the eighth line 980 is an operation command loading a value stored in the memory [sp+4] to the register p1.

An operation command of a ninth line 990 has an operation ID op8. The operation command of the ninth line 990 stores a sum of the registers p1 and p2 in the register p2. The operation command of the ninth line 990 provides the register p2 with a final result value. Since a logical register r5 corresponds to the physical register p2, a program code of FIG. 9 may provide the logical register r5 with the final result value.

Referring to FIGS. 1, 3, and 5, operation S140 compares operation results of operation commands having an identical operation ID. As an example, an operation command of FIG. 3 having an operation ID op5 stores "5", that is a sum of a register r4 storing "2" and "3", in a register r3. The operation command of FIG. 9 having operation ID op5 stores a sum "5" of the register p2 storing "2" and "3" in the register p1.

Above two operation results are an identical "5". According to an aspect, an error during the transforming operation may be detected by tracking each operation command of a program code being transformed by a compiler. According to an aspect, transforming operation of a compiler may be verified by selecting an appropriate program code, and an error may be reported to a user once the error is detected. According to an aspect, an error may be easily corrected since an operation command having an error having occurred during the course of transforming operation is identified. According to an aspect, a compiler may perform a compiling operation under a condition that operation commands having an identical operation ID have identical input and output values. Under the above condition, although operands of the operation commands are different, operation results of the operation commands having the identical operation ID have identical input and output values.

Figure 10:
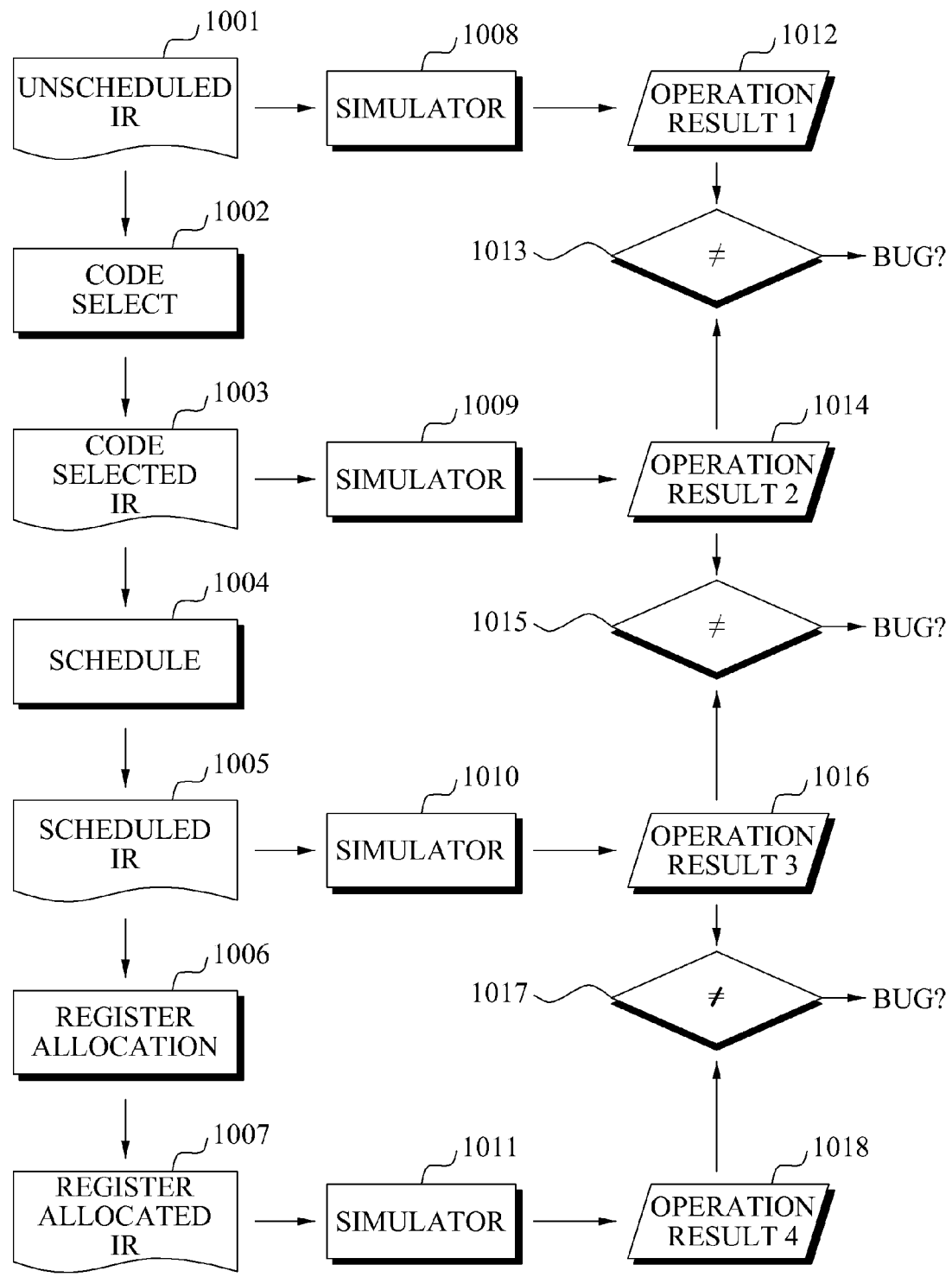
FIG. 10 is a diagram illustrating a compiler and a debugging method of the compiler according to an exemplary embodiment.

FIG. 10 illustrates a compiler and a debugging method of the compiler according to an exemplary embodiment.

Referring to FIG. 10, the compiler compiles intermediate representation (IR), which is easy to process in the compiler, to transform the IR to a programming language which is easy to process in a processor.

The compiler performs unscheduled IR 1001 according to a code select scheme, thereby including a selection module 1002 generating a code selected IR 1003.

The compiler may include a scheduling module 1004 generating a scheduled IR 1005 by scheduling the code selected IR 1003.

The compiler may include a register allocation module 1006 generating a register allocated IR 1007 by register-allocating the scheduled IR 1005.

The debugging method of the compiler may generate an operation result (1) 1012 of the unscheduled IR 1001 using a simulator 1008. The debugging method of the compiler may generate an operation result (2) 1014 of the code selected IR 1003 using a simulator 1009.

The debugging method of the compiler may compare the operation result (1) 1012 with the operation result (2) 1014 using a verification module 1013. Where the operation result (1) 1012 is not identical to the operation result (2) 1014, the debugging method of the compiler considers that a bug exists in the compiler and may report to a user an operation ID whose operation result is not identical.

The debugging method of the compiler may generate an operation result (3) 1016 of the scheduled IR 1005 using a simulator 1010. The debugging method of the compiler may compare the operation result (2) 1014 with the operation result (3) 1016 using the verification module 1015. Where the operation result (2) 1014 is not identical to the operation result (3) 1016, the debugging method of the compiler considers that a bug exists in the compiler, and may report to the user an operation ID whose operation result is not identical.

The debugging method of the compiler may generate an operation result (4) 1018 of the used register allocated IR 1007 using a simulator 1011. The debugging method of the compiler may compare the operation result (3) 1016 with the operation result (4) 1018 using the verification module 1017. Where the operation result (3) 1016 is not identical to the operation result (4) 1018, the debugging method of the compiler considers that a bug exists in the compiler and may report to the user an operation ID whose operation result is not identical.

Figure 11:
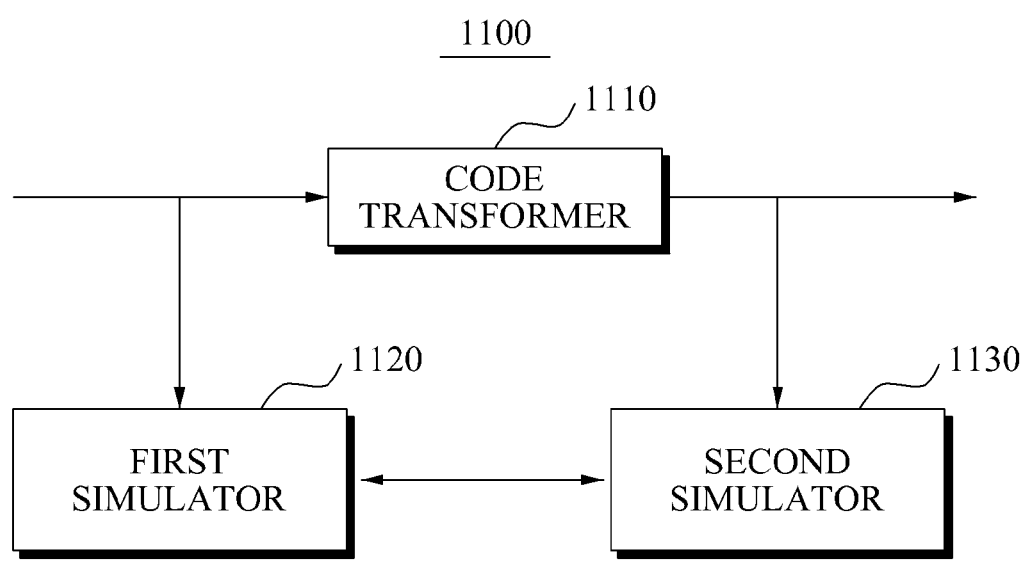
FIG. 11 is a diagram illustrating a processor according to an exemplary embodiment.

FIG. 11 illustrates a processor 1100 according to an exemplary embodiment.

As shown in FIG. 11, the processor 1100 includes a code transformer 1110, a first simulator 1120, and a second simulator 1130.

The processor 1100 may include a plurality of functional units, and use the plurality of functional units according to operation commands to be executed in parallel.

The code transformer 1110 may compile a first program code to generate a second program code. The first program code may include at least one first operation command, and the second program code may include at least one second operation command.

The first simulator 1120 simulates the first program code to generate a first operation result. The second simulator 1130 simulates the second program code to generate a second operation result. The processor 1100 may be a reconfigurable processor capable of processing operation commands in parallel, and the first program code may be a described program code which is suitable for being executed in the processor 1100.

The first simulator 1120 may process the at least one first operation command in parallel using the plurality of functional units. The second simulator 1130 may process the at least one second operation command in parallel using the plurality of functional units.

The code transformer 1110 may assign an operation ID to each of the at least one first operation command.

The processor 1100 may compare the first operation result of the first operation command with the second operation result of the second operation command having an identical operation identifier to an operation identifier of the first operation command. The processor 1100 may verify whether the second program code is valid by detecting each operation result of the at least one first operation command and the at least one second operation command.

The processor 1100 may verify the validity of the compiling operation of the code transformer 1110 by verifying the validity of the second program code.

The code transformer 1110 may register-allocate the first program code so that a number of registers which are simultaneously activated while the first program code is executing does not surpass a number of registers supported by hardware.

The code transformer 1110 may transmit stack information of the second program code, which is generated by register-allocating the first program code, to the first simulator 1120. The first simulator 1120 may simulate the first program code by referring to the stack information.

The methods described above including methods for compiling and/or debugging of a compiler may be recorded, stored, or fixed in one or more computer-readable media that include program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. A compiling method, the method comprising:
   simulating program code which includes at least one first operation command to generate a first operation result;
   translating the program code into machine code of a processor that comprises at least one second operation command;
   simulating the machine code to generate a second operation result; and
   comparing the first operation result with the second operation result to verify whether the machine code is valid,
   wherein:
   the translating of the program code comprises register-allocating the program code, and
   the simulating of the program code comprises simulating the program code by referring to stack information of the machine code, which is generated after the program code is register-allocated.

2. The method of claim 1, wherein:
   the translating of the program code further comprises assigning an operation identifier to each of the at least one first operation command, and
   the comparing of the first operation result with the second operation result comprises comparing an operation result of each of the at least one first operation command with an operation result of one of the at least one second operation command which corresponds to the operation identifier assigned to the first operation command.

3. The method of claim 1, wherein the comparing of the first operation result with the second operation result does not verify an operation result of the at least one second operation command having no corresponding operation identifier from among operation identifiers assigned to the at least one first operation command.

4. The method of claim 1, wherein the comparing of the first operation result with the second operation result does not verify an operation result of the at least one first operation command having no second operation command which corresponds to operation identifiers assigned to the at least one first operation command.

5. The method of claim 1, wherein the translating of the program code comprises scheduling the program code based on parallelism of a processor where the program code is executed.

6. The method of claim 1, wherein the translating of the program code further comprises register-allocating the program code so that a number of registers which are simultaneously activated while the program code is executed does not surpass a number of registers supported by hardware.

7. A non-transitory computer-readable storage medium storing a program to implement a compiling method, the program comprising instructions to cause a computer to:
simulate program code which includes at least one first operation command to generate a first operation result;
translate the program code into machine code of a processor that comprises at least one second operation command;
simulate the machine code to generate a second operation result; and
compare the first operation result with the second operation result to verify whether the machine code is valid, wherein:
the translating of the program code comprises register-allocating the program code, and
the simulating of the program code comprises simulating the program code by referring to stack information of the machine code, which is generated after the program code is register-allocated.

8. A processor comprising:
a code transformer configured to translate program code which includes at least one first operation command into machine code of a computer comprising at least one second operation command;
a first simulator configured to simulate the program code to generate a first operation result; and
a second simulator configured to simulate the machine code to generate a second operation result, wherein:
the processor verifies whether the machine code is valid by comparing the first operation result and the second operation result,
the code transformer register-allocates the program code and transmits stack information of the machine code, which is generated after the program code is register-allocated, and
the first simulator simulates the program code by referring to the stack information.

9. The processor of claim 8, wherein:
the code transformer assigns an operation identifier to each of the at least one first operation command, and
the processor compares an operation result of each of the at least one first operation command with an operation result of one of the at least one second operation command which corresponds to the operation identifier assigned to the first operation command.

10. The processor of claim 8, wherein the code transformer register-allocates the program code so that a number of registers which are simultaneously activated while the program code is executed does not surpass a number of registers supported by hardware.

11. The processor of claim 8, wherein the processor is a reconfigurable processor having a plurality of functional units that are configured to be used in parallel according to operation commands to be executed.

* * * * *